United States Patent [19]
Lorenz et al.

[11] Patent Number: 5,382,765
[45] Date of Patent: Jan. 17, 1995

[54] GROUNDING SWITCH FOR A COMPRESSED-GAS-INSULATED, METAL-ENCASED HIGH-VOLTAGE SWITCHING SYSTEM

[75] Inventors: Dieter Lorenz; Christian Pircher; Petra Geier; Helmut Holler; Dietrich Pfaff, all of Berlin, Germany

[73] Assignee: Siemens Aktiengesellschaft, Munich, Germany

[21] Appl. No.: 844,579

[22] PCT Filed: Aug. 14, 1990

[86] PCT No.: PCT/DE90/00632
§ 371 Date: May 27, 1992
§ 102(e) Date: May 27, 1992

[87] PCT Pub. No.: WO91/05356
PCT Pub. Date: Apr. 18, 1991

[30] Foreign Application Priority Data
Sep. 27, 1989 [DE] Germany ............... 3932775
Jun. 18, 1990 [DE] Germany ............... 4019686

[51] Int. Cl.$^6$ ............... H01H 33/54; H01H 33/50
[52] U.S. Cl. ............... 200/148 R; 200/50 A; 200/148 B
[58] Field of Search ........... 200/144 R, 146 R, 148 R, 200/148 F, 150 R, 148 B; 361/54, 56, 57

[56] References Cited
U.S. PATENT DOCUMENTS

| | | | |
|---|---|---|---|
| 3,987,260 | 10/1976 | Wilson | 200/148 B |
| 4,314,231 | 2/1982 | Walty | 338/328 |
| 4,427,858 | 1/1984 | Fehr et al. | 200/146 R |
| 4,486,634 | 12/1984 | Nakano et al. | 200/148 R |
| 4,536,659 | 8/1985 | Seitz et al. | 307/41 |

*Primary Examiner*—A. D. Pellinen
*Assistant Examiner*—Michael A. Friedhofer
*Attorney, Agent, or Firm*—Kenyon & Kenyon

[57] ABSTRACT

In a grounding switch for an encased high-voltage switching system, the movable switching piece is moved by a rotating drive shaft. This drive shaft passes through the housing of the grounding switch. To design the contact elements that transfer the ground potential to the movable switching piece as simply as possible, the drive shaft consists of electrically conductive material. In addition, the drive shaft is insulated as it enters the housing. The drive shaft is also coupled with means to transfer the ground potential, e.g., a current strip, outside the housing. Thus, the drive shaft serves both to transfer force and to transfer potential. A switch blade is designed to be elastically deformable in part, and serves as the movable switching piece. This grounding switch for an encased, compressed-gas-insulated high-voltage switching system can also be used as an insulated grounding switch to carry out measurements.

20 Claims, 5 Drawing Sheets

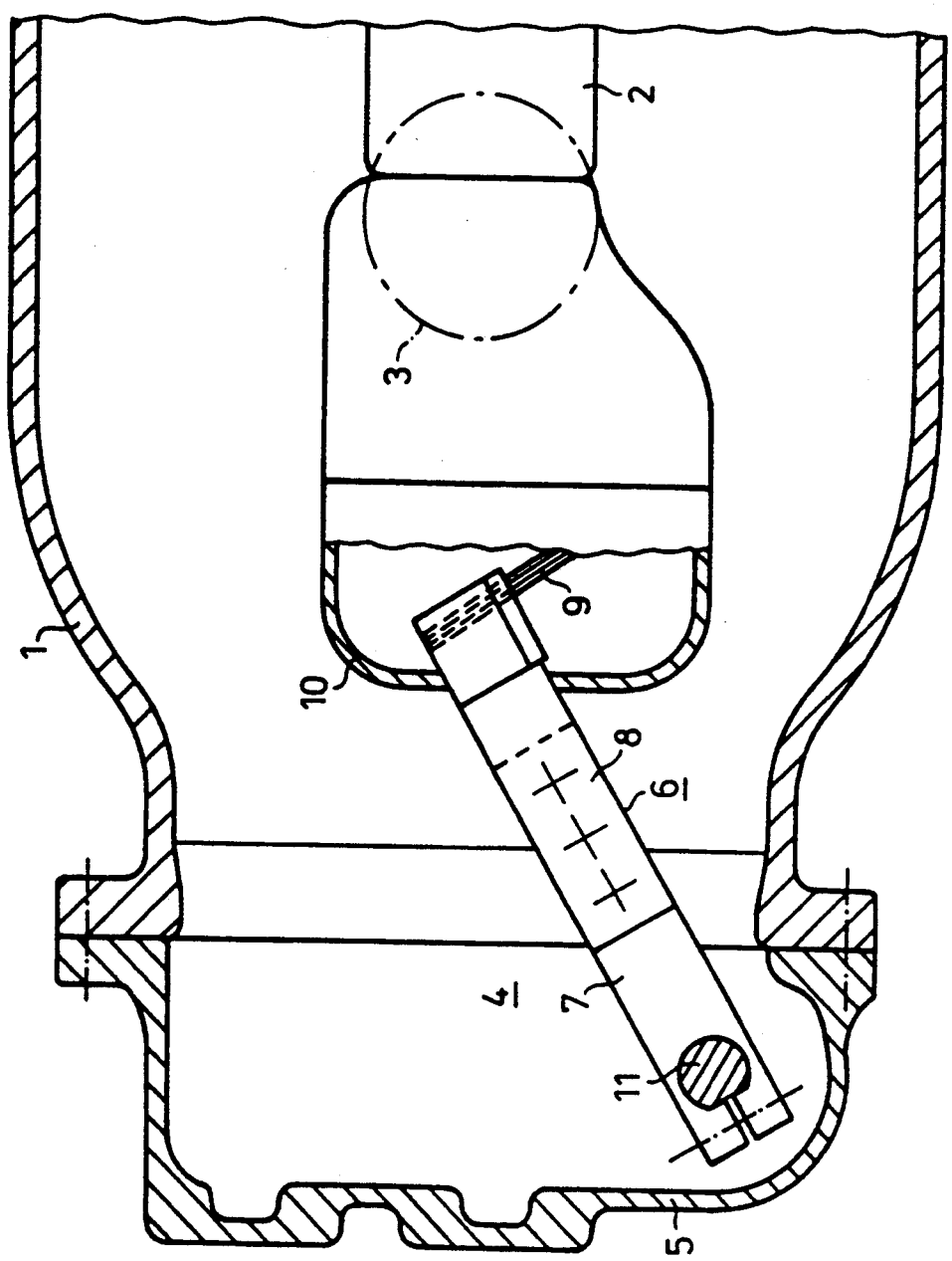

GROUNDING SWITCH FOR A COMPRESSED-GAS-INSULATED, METAL-ENCASED HIGH-VOLTAGE SWITCHING SYSTEM

BACKGROUND OF THE INVENTION

The present invention relates generally to grounding switches for a compressed-gas-insulated, metal-encased high-voltage switching systems, and more particularly to such a grounding switch in which the casing as well as the housing is applied to ground potential. Furthermore, the present invention relates to such a grounding switch in which the movable switching piece is insulated in gas form or by insulation material in the housing of the grounding switch, and is moved by a rotating drive shaft. Finally, the present invention relates to such a grounding switch in which the drive shaft passes through the housing, and contact elements transfer the ground potential to the movable switching piece, where the connection to the ground potential is disconnectable.

EP-A-0 075 922 discloses such a grounding switch. This known grounding switch serves not only to transfer the ground potential, but is also insulated for measurement purposes. For this reason the disconnectable connection to ground potential, which is structured so as to be disconnected, is eliminated. In the known grounding switch, a ring of insulation material is provided between the casing of the high-tension switching system and the housing of the grounding switch, which galvanically separates the two parts. These two parts normally carry ground potential. The means for transferring ground potential to the movable switching piece has slide contacts resting against the switching piece and is insulated relative to the housing of the grounding switch, thus making the switching piece suitable also to carry measurement currents.

The present invention is directed to the problem of developing a means for transferring ground potential to the movable switching piece in the above described grounding switch, in a particularly simple manner.

SUMMARY OF THE INVENTION

The present invention solves this problem by providing that the drive shaft, which consists of electrically conductive material, pass into the housing in insulated form, by providing that the outside of the housing is connected with means for transferring the ground potential, and by providing that the movable switching piece is a switch blade rigidly connected with the drive shaft. The first end of the switch blade is designed not to bend and is coupled at a fixed and to the drive shaft, while the second end of the switch blade is designed to be elastic.

The rotating drive shaft thus fulfills a dual function: It serves not only to transfer force and movement to the movable switching piece, but also to introduce ground potential. This is made possible by insulating the drive shaft relative to the housing. To this end, a bushing of insulation material corresponding to the diameter of the drive shaft is sufficient. The connections which are present for force transfer from the drive shaft to the movable switching piece also conduct the potential, i.e. carry currents. The housing of the grounding switch does not have to be galvanically separated from the casing of the high-voltage switching system.

The movable switching piece is designed as a switch blade, which is rigidly connected with the drive shaft. When high short-circuit currents occur, the coupling between the switch blade and the drive shaft is exposed to high current forces. In order to prevent deformation or bending of the switch blade, the first end of the switch blade is designed not to bend, and is attached at a fixed angle to the drive shaft. The free end of the switch blade is designed to be elastic to allow lateral elastic deflection. In this way, tolerances in the relative positioning of the counter-contacts to the switch blade can be balanced out without any subsequent adjustment.

The blade contact is elastically deformed, if the positioning is not sufficiently accurate when it enters into the counter-contact. The blade holder is shorter compared with known blade holders, in order to leave an elastic region of the blade contact free.

Elastic deflectability of the blade contact can also be achieved, according to the present invention, by providing that the switch blade consist of a rigid blade holder attached to the drive shaft, and by providing that the blade holder has a region with a reduced cross-section at its end facing the contact blade.

For example, the blade holder can narrow in the direction of the blade contact, starting from its end that is attached to the drive shaft to allow elastic deflection of the blade holder. However, it is also possible that the blade holder has recesses at one or more points, such as notches or millings, which make it elastically deformable.

Since the transfer of ground potential to the drive shaft is carried out by means which are located outside of the housing, i.e. the casing, the drive shaft can be connected with the ground potential there, without space or assembly problems, by means of a contact piece or a current strip. This connection can furthermore be easily accessed and monitored, and can be interrupted again, if necessary.

For insulation of the drive shaft relative to the housing, i.e. that of the movable switching pin relative to the housing, it is advantageous to use an insulation bushing made of polytetrafluoroethylene, since this insulation material has good non-friction properties, but also has a high voltage resistance. In order to simplify production of the insulation bushing, it could also consist of a cured duroplastic material, such as epoxy resin, particularly cast resin, since such a duroplastic material has stable mechanical properties when heated.

BRIEF DESCRIPTION OF THE DRAWINGS

FIGS. 1–4 show cross-sections through a part of a pressure container of a metal-encased, compressed-gas-insulated high-voltage switching system to which different grounding switches are connected.

DETAILED DESCRIPTION

A circuit-breaker unit 2 (only indicated in general), of a high-voltage power switch is connected with a shielded electrical conductor 3 and is located in a pressure container forming the casing 1 of a high-voltage switching system which is insulated with $SF_6$ compressed gas and encased with metal. This electrical conductor 3 normally carries high voltage. The circuit-breaker unit 2 is connected with the other parts and devices (not shown) of the high-voltage switching system, via the electrical conductor 3.

Figure 1:
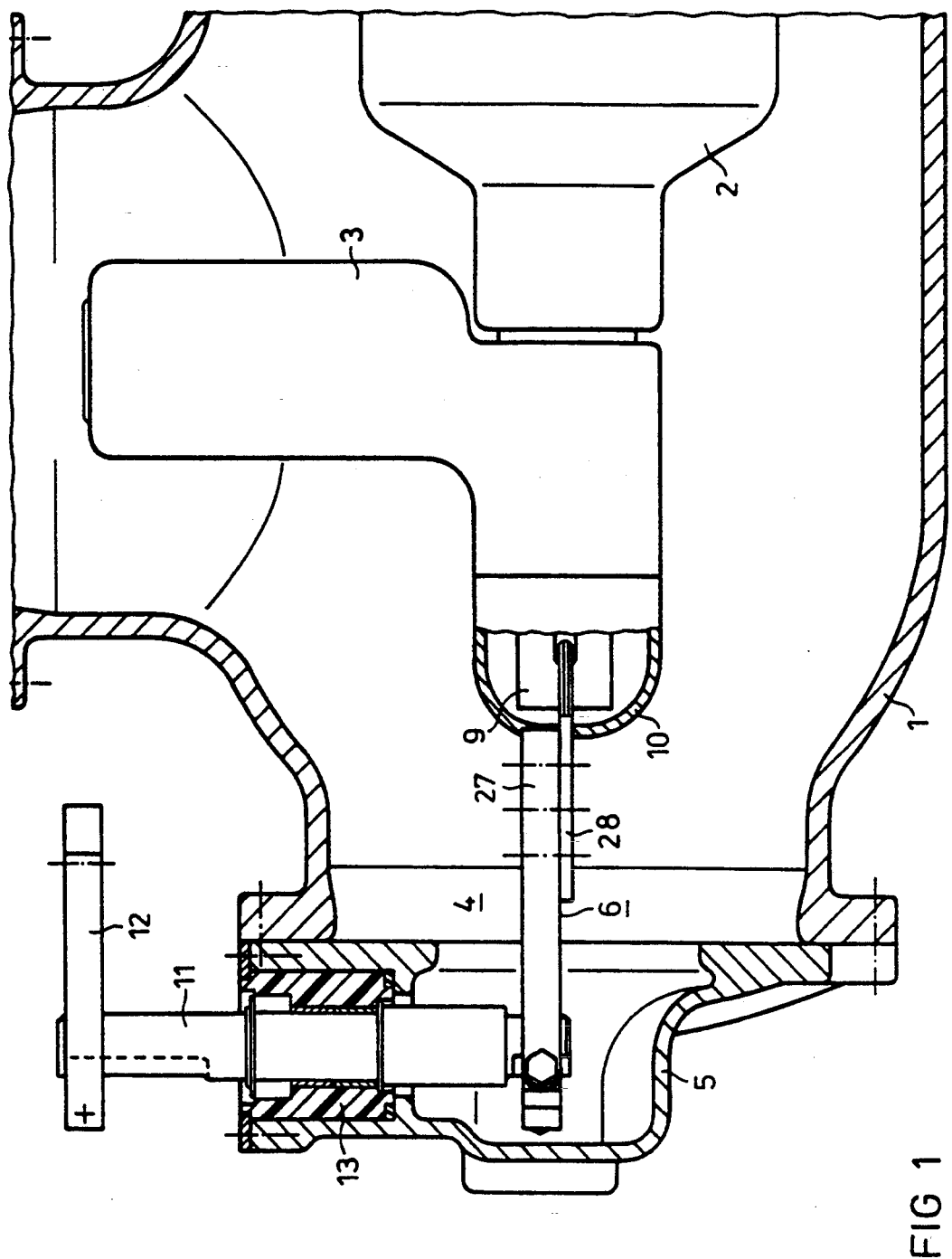

Furthermore, a grounding switch 4 is provided. The housing 5 of the grounding switch 4 is flanged onto the pressure container 1. This grounding switch 4 is designed as a blade grounding switch. The movable switching piece 6 of the grounding switch 4 consists of a blade holder 7, (FIGS. 3 and 4), 27 (FIG. 1) and 37 (FIG. 2), to which the blade contact 8, (FIGS. 3 and 4), 28 (FIG. 1) and 38 (FIG. 2) is attached. The blade contact 8, 28 and 28 comes to rest against a counter-contact 9 in the turned-on position. FIG. 1 shows a blade holder 27 which leaves only a small region of the blade contact 28 free. In comparison, the blade holder 7 is designed to be significantly shorter in the embodiment shown in FIGS. 3 and 4, so that a larger region of the blade contact 8 remains free. As a result, the blade contact 8 can be elastically deflected in the grounding switch shown in FIGS. 3 and 4, to balance out positioning tolerances between the blade contact 8 and the counter-contact 9. The blade holder 7 is designed to resist bending and coupled to the drive shaft 11 at a fixed angle, to prevent deformation of the blade holder 7 due to current forces when short-circuit currents occur.

Figure 2:
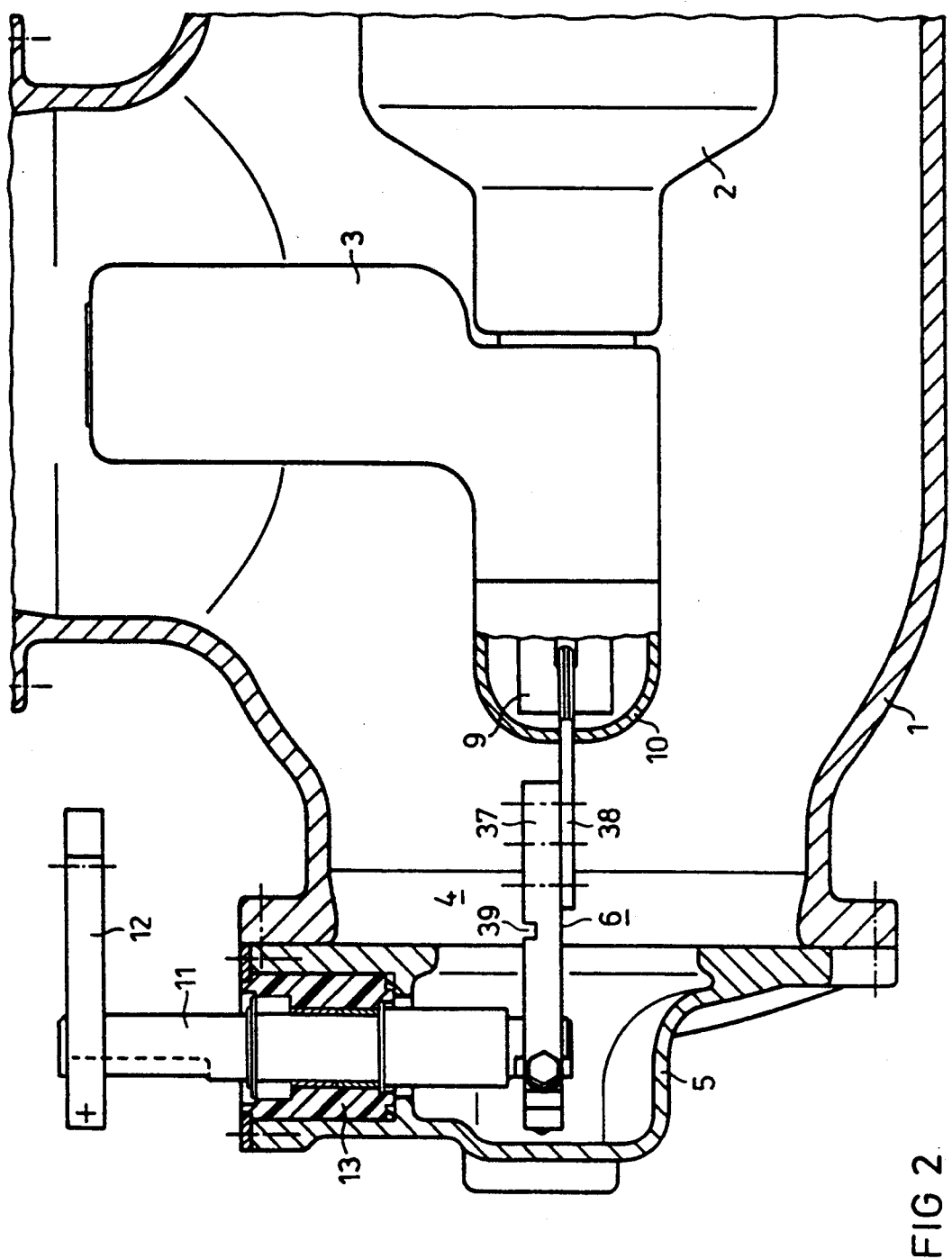
Figure 3:
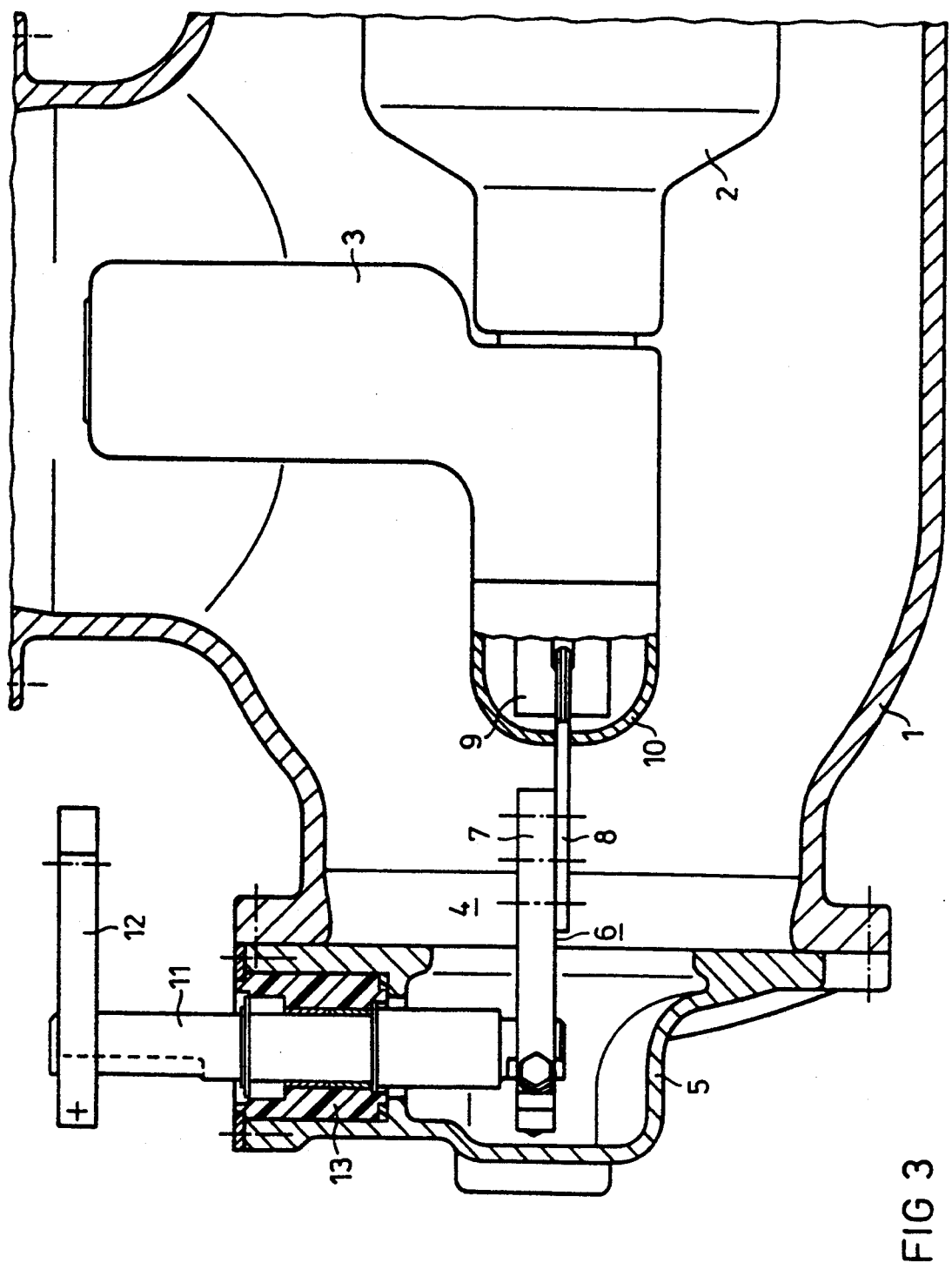

In the embodiment shown in FIG. 2, the blade holder 37 has a recess 39 at one side. This recess 39 can be milled out, for example. With this milling, the blade holder 37 can be more easily deformed, and the blade contact 38 can be elastically deflected.

The counter-contact 9 is galvanically connected with the electrical conductor 3 and lies within the shielding 10 of the conductor 3. In this way, the electrical conductor 3 can be connected with ground potential. In FIGS. 1 to 4, the turned-on position of the grounding switch 4 is shown in each case.

The movement of the movable switching piece 6 of the grounding switch 4 is triggered by the rotating drive shaft 11. To trigger the switching movement, a drive located (not shown) outside the housing 5 is used. The drive is connected with the drive shaft 11 via a drive lever 12, and controls the turn-on and shut-off movement of the movable switching piece 6.

Figure 6:
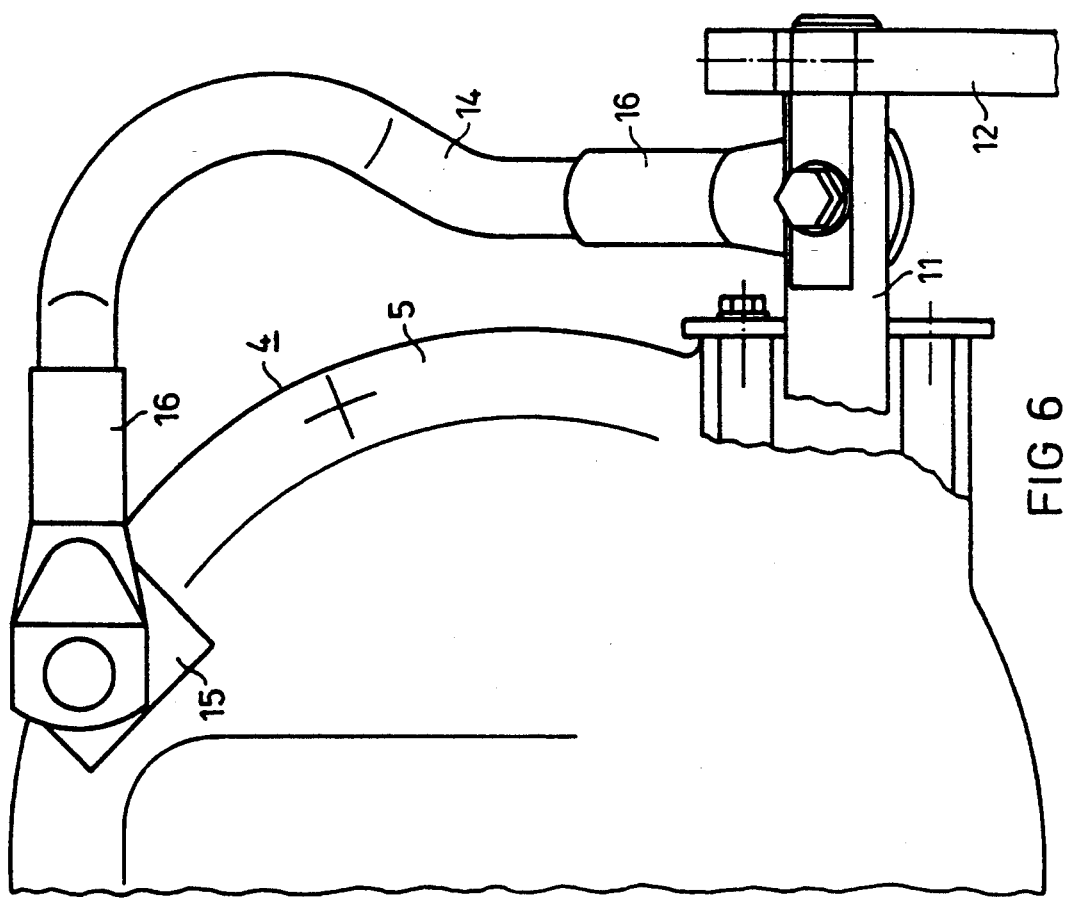
FIGS. 5 and 6 each show an outside view of the housing of the grounding switch.
Figure 5:
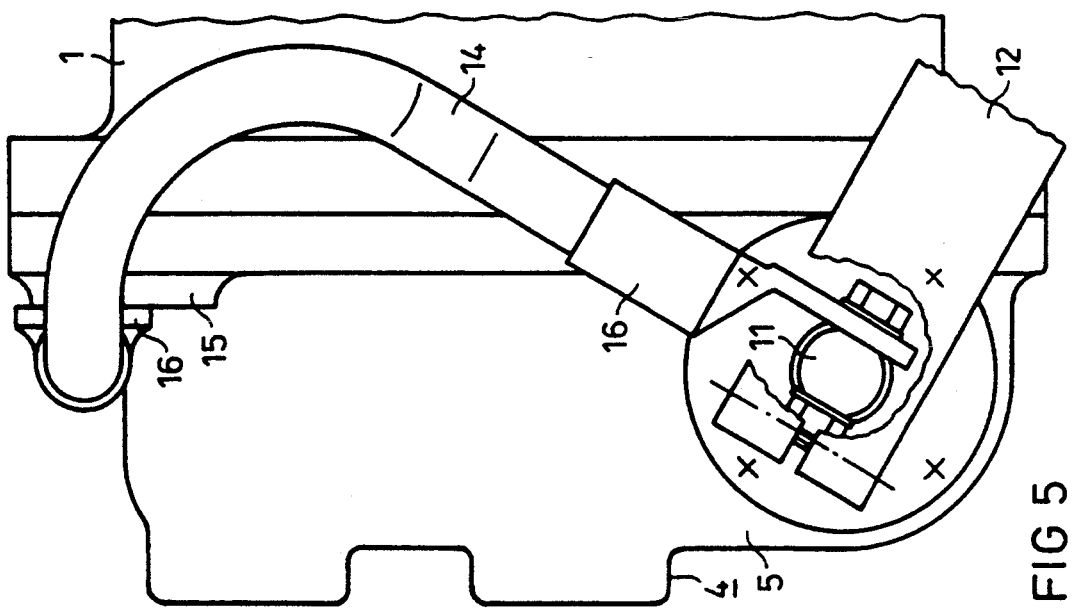

However, the drive shaft 11 serves to transfer the ground potential. For this purpose, the drive shaft 11 consists of electrically conductive material, such as copper, aluminum or, if necessary, steel. It is insulated using an insulation bushing 13, and is introduced into the housing 5 of the grounding switch 4 in sealed manner. This insulation bushing 13 consists of polytetrafluoroethylene, which has not only good non-friction properties, but also good voltage resistance. The ground potential is transferred by means of a flexible current strip 14 formed of copper braid, which is connected with the housing 5 of the grounding switch 4 on one side (see particularly FIGS. 5 and 6) and with the drive shaft 11 on the other side.

The current strip 14 is provided with a cable socket 16 at both ends, with which it is attached to the bridge 15 or the drive shaft 11. In order to show the attachment of the cable socket 16 of the current strip 14 at the drive shaft 11, the drive lever 12 which lies in front of it is shown partially broken away in FIG. 5.

This current strip 14, which is thus located on the outside of the housing 5 of the grounding switch, is easily accessible and can be disconnected without difficulties, if necessary, if the connection to the ground potential is supposed to be interrupted, because the grounding switch 4 is being used for measurement purposes. In this case, the grounding switch can function like an insulated grounding switch, because the the drive shaft 11 is insulated.

We claim:

1. A grounding switch for a compressed-gas-insulated, metal-encased high-voltage switching system, comprising:
   a) a casing being applied to ground potential;
   b) a housing being applied to ground potential;
   c) a conductor having a counter-contact to which ground potential is to be applied;
   d) a movable switching piece comprising a switch blade, being insulated in said housing either by gas or insulation material, having a first end being rigid and having a second end being elastically movable in a direction perpendicular with respect to a plane of rotation of said switching piece;
   e) a rotating drive shaft moving said movable switching piece, making a disconnectable connection between said movable switching piece and said counter-contact for transferring ground potential to the conductor, having an insulation bushing enabling said drive shaft to pass through said housing in an insulated manner, and being comprised of an electrically conductive material, wherein the first end of said switch blade is rigidly coupled at a fixed angle to said drive shaft; and
   f) means for transferring ground potential outside of said housing, said ground potential transferring means being coupled with said drive shaft, whereby ground potential is transferred outside of the housing to the drive shaft.

2. The grounding switch according to claim 1, wherein said switch blade further comprises:
   a) a rigid blade holder being coupled to said drive shaft; and
   b) an elastic blade contact having a free, elastically deflectable region projecting beyond said blade holder.

3. The grounding switch according to claim 1, wherein said switch blade further comprises:
   a) a rigid blade holder being coupled to said drive shaft and having a reduced cross section in a central region of the rigid blade holder; and
   b) a blade contact mounted to the rigid blade holder.

4. The grounding switch according to claim 1, wherein said means for transferring ground potential further comprises a current strip being coupled to the outside of said housing and transferring ground potential to said drive shaft, whereby said current strip is disconnectable.

5. The grounding switch according to claim 2, wherein said means for transferring ground potential further comprises a current strip being coupled to the outside of said housing and transferring ground potential to said drive shaft, whereby said current strip is disconnectable.

6. The grounding switch according to claim 3, wherein said means for transferring ground potential further comprises a current strip being coupled to the outside of said housing and transferring ground potential to said drive shaft, whereby said current strip is disconnectable.

7. The grounding switch according to claim 1, wherein said insulation bushing for the drive shaft comprises polytetrafluoroethylene material.

8. The grounding switch according to claim 2, wherein said insulation bushing for the drive shaft comprises polytetrafluoroethylene material.

9. The grounding switch according to claim 3, wherein said insulation bushing for the drive shaft comprises polytetrafluoroethylene material.

10. The grounding switch according to claim 4, wherein said insulation bushing for the drive shaft comprises polytetrafluoroethylene material.

11. The grounding switch according to claim 5, wherein said insulation bushing for the drive shaft comprises polytetrafluoroethylene material.

12. The grounding switch according to claim 6, wherein said insulation bushing for the drive shaft comprises polytetrafluoroethylene material.

13. The grounding switch according to claim 1, wherein said insulation bushing for the drive shaft comprises a cured duroplastic material.

14. The grounding switch according to claim 2, wherein said insulation bushing for the drive shaft comprises a cured duroplastic material.

15. The grounding switch according to claim 3, wherein said insulation bushing for the drive shaft comprises a cured duroplastic material.

16. The grounding switch according to claim 4, wherein said insulation bushing for the drive shaft comprises a cured duroplastic material.

17. The grounding switch according to claim 5, wherein said insulation bushing for the drive shaft comprises a cured duroplastic material.

18. The grounding switch according to claim 6, wherein said insulation bushing for the drive shaft comprises a cured duroplastic material.

19. The grounding switch according to claim 1, wherein said insulation busing for the drive shaft comprises epoxy resin.

20. The grounding switch according to claim 1, wherein said insulation bushing for the drive shaft comprises a cast epoxy resin.

* * * * *